(12) United States Patent
Kashiwabara et al.

(10) Patent No.: US 10,767,524 B2
(45) Date of Patent: Sep. 8, 2020

(54) CYLINDER HEAD COVER STRUCTURE FOR ENGINE

(71) Applicant: Mazda Motor Corporation, Aki-gun, Hiroshima (JP)

(72) Inventors: Takashi Kashiwabara, Aki-gun (JP); Satoshi Nozawa, Hiroshima (JP); Suguru Fukui, Hiroshima (JP)

(73) Assignee: Mazda Motor Corporation, Aki-gun, Hiroshima (JP)

( * ) Notice: Subject to any disclaimer, the term of this patent is extended or adjusted under 35 U.S.C. 154(b) by 2 days.

(21) Appl. No.: 16/031,089

(22) Filed: Jul. 10, 2018

(65) Prior Publication Data

US 2019/0017420 A1    Jan. 17, 2019

(30) Foreign Application Priority Data

Jul. 12, 2017    (JP) .................. 2017-136559

(51) Int. Cl.
*F01M 13/04* (2006.01)
*F01M 13/02* (2006.01)
(Continued)

(52) U.S. Cl.
CPC .......... *F01M 13/04* (2013.01); *F01M 13/021* (2013.01); *F01M 13/022* (2013.01);
(Continued)

(58) Field of Classification Search
CPC ............... F01M 13/0416; F01M 13/04; F01M 2013/0461; F01M 13/0011; F01M 13/00;
(Continued)

(56) References Cited

U.S. PATENT DOCUMENTS 3,194,221 A * 7/1965 Dinger .................... F02B 23/00
                                                        123/193.5
4,993,375 A * 2/1991 Akihiko ............. F01M 13/0416
                                                        123/195 C
(Continued)

FOREIGN PATENT DOCUMENTS

CN        1755185 A     4/2006
CN        1904332 A     1/2007
(Continued)

*Primary Examiner* — George C Jin
*Assistant Examiner* — Teuta B Holbrook
(74) *Attorney, Agent, or Firm* — Alleman Hall Creasman & Tuttle LLP

(57) ABSTRACT

A cylinder head cover structure of an engine includes a positive crankcase ventilation (PCV) valve releasing blow-by gas from an oil separating chamber to an intake system of the engine. The oil separating chamber is included in an oil separator provided to an interior of a cylinder head cover. In the oil separating chamber, oil mist is separated and removed from the blow-by gas. The PCV valve is located between a portion of a defining wall and an exterior wall of the cylinder head cover, and supported by the defining wall and the exterior wall, the defining wall defining the oil separating chamber and the cam housing, and the exterior wall being spaced apart from the portion of the defining wall. The PCV valve is surrounded by a space communicating with the cam housing.

9 Claims, 11 Drawing Sheets

(51) Int. Cl.
*F02M 35/10* (2006.01)
*F02F 7/00* (2006.01)

(52) U.S. Cl.
CPC .. *F01M 13/0416* (2013.01); *F02M 35/10157* (2013.01); *F02M 35/10222* (2013.01); *F01M 2013/027* (2013.01); *F01M 2013/0433* (2013.01); *F01M 2013/0438* (2013.01); *F02F 7/006* (2013.01)

(58) Field of Classification Search
CPC ................ F01M 13/0405; F02F 7/006; F02M 35/10157; F02M 35/10222
USPC .................................................. 123/572–574
See application file for complete search history.

(56) References Cited

U.S. PATENT DOCUMENTS

| | | | | |
|---|---|---|---|---|
| 10,329,975 | B2* | 6/2019 | Fujii | F01M 13/0416 |
| 2001/0025633 | A1* | 10/2001 | Takada | F02B 25/06 |
| | | | | 123/572 |
| 2001/0042527 | A1 | 11/2001 | Uchida | |
| 2002/0111087 | A1* | 8/2002 | Kuroda | F02B 61/045 |
| | | | | 440/88 L |
| 2003/0172632 | A1 | 9/2003 | Matsubara et al. | |
| 2004/0187838 | A1* | 9/2004 | Nonogaki | F02F 7/006 |
| | | | | 123/198 E |
| 2006/0070599 | A1* | 4/2006 | Nonogaki | F02F 7/006 |
| | | | | 123/195 C |
| 2007/0017282 | A1 | 1/2007 | Tooyama et al. | |
| 2008/0060595 | A1 | 3/2008 | Yoshijima et al. | |
| 2010/0192887 | A1 | 8/2010 | Iwata | |
| 2012/0247438 | A1* | 10/2012 | Konohara | F01M 13/022 |
| | | | | 123/559.1 |
| 2014/0224232 | A1* | 8/2014 | Hotta | F02B 37/16 |
| | | | | 123/574 |
| 2016/0123199 | A1* | 5/2016 | Yamada | F01M 13/0011 |
| | | | | 123/574 |
| 2016/0195037 | A1 | 7/2016 | Kira | |
| 2016/0265404 | A1* | 9/2016 | Fujii | F01M 13/0416 |
| 2018/0038274 | A1 | 2/2018 | Ebesu et al. | |

FOREIGN PATENT DOCUMENTS

| | | |
|---|---|---|
| CN | 101103194 A | 1/2008 |
| CN | 101815850 A | 8/2010 |
| CN | 105569770 A | 5/2016 |
| CN | 205400911 U | 7/2016 |
| JP | H10234713 U | 3/1990 |
| JP | H10343536 A | 4/1991 |
| JP | H106193460 A | 7/1994 |
| JP | 2001329885 A | 11/2001 |
| JP | 2003049625 A | 2/2003 |
| JP | 2003254031 A | 9/2003 |
| JP | 2006242107 A | 9/2006 |
| JP | 2007032309 A | 2/2007 |
| JP | 2009150289 A | 7/2009 |
| JP | 2016160794 A | 9/2016 |
| JP | 2016205240 A | 12/2016 |

* cited by examiner

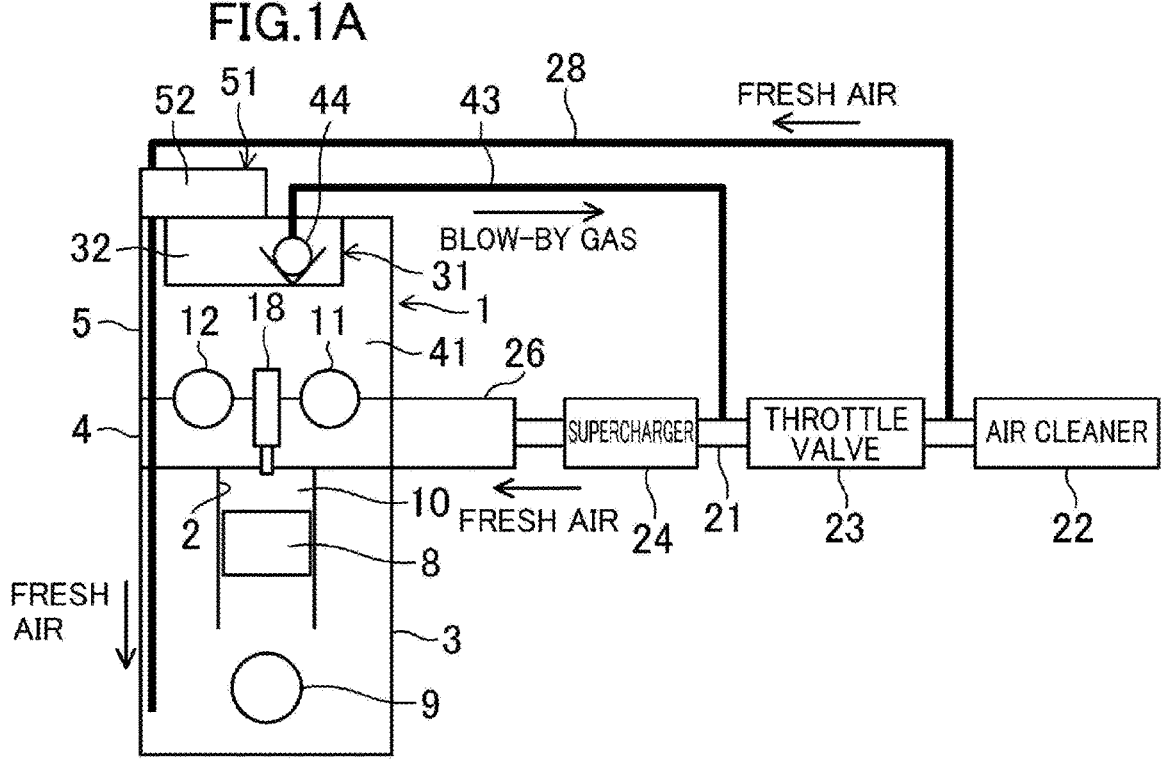
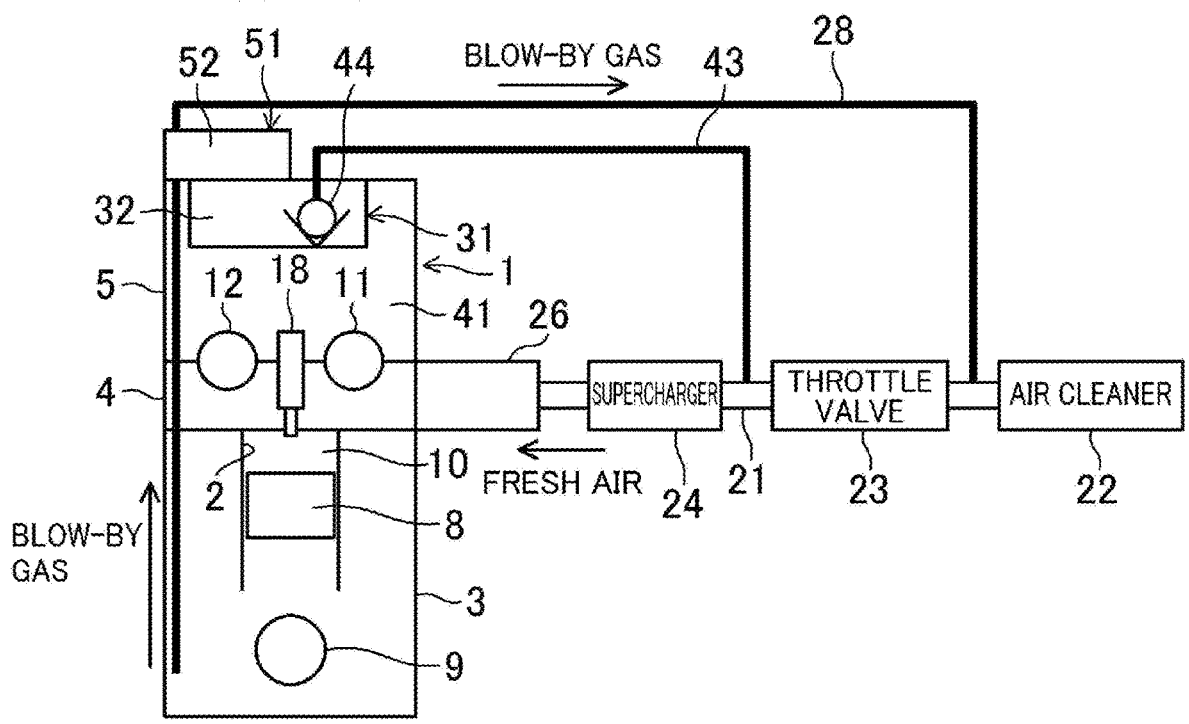

CYLINDER HEAD COVER STRUCTURE FOR ENGINE

CROSS-REFERENCE TO RELATED APPLICATION

This application claims priority to Japanese Patent Application No. 2017-136559 filed on Jul. 12, 2017, the entire disclosure of which is hereby incorporated by reference.

BACKGROUND

The technique disclosed in this specification relates to a cylinder head cover structure for an engine.

A typical cylinder head cover, placed over the top of a cylinder head of an engine, is provided with an oil separator on the interior of the cylinder head cover. (See, for example, Japanese Unexamined Patent Publication No. 2009-150289.) This oil separator includes an oil separating chamber for separating and removing oil mist contained in blow-by gas. An exterior wall of the cylinder head cover is provided with a positive crankcase ventilation (PCV) valve. The PCV valve releases the blow-by gas, from which the oil mist is separated and removed in the oil separating chamber, from the oil separating chamber to the intake system of the engine.

In cold weather, the valve body of the PCV valve could be less likely to operate smoothly because of frozen water contained in blow-by gas adhering to the PCV valve. Hence, in order to keep the PCV valve from freezing and facilitate defrosting of the PCV valve, the above publication discloses the following: an opening is provided on a separator plate acting as a partition wall between a blow-by chamber (the oil separating chamber) and a rocker housing (a cam housing), and a tip end of the PCV valve is projected through the opening into the rocker housing so that the tip end of the PCV valve is heated by the heat of lubricant oil splashing inside the rocker housing and the heat inside the rocker housing.

SUMMARY

When the tip end of the PCV valve alone merely projects into the rocker housing (the cam housing) as cited in the above publication, the heat might not be sufficiently conducted to an operating part (i.e., a part which malfunctions when frozen; namely, a valve body) of the PCV valve. Hence, the technique disclosed in the publication needs improvement.

The technique disclosed herein is intended to provide a cylinder head cover structure for an engine. The structure efficiently heats an operating part of a PCV valve to keep the PCV valve from freezing, and allows the PCV valve to defrost quickly when the PCV valve is frozen.

In order to achieve this intention, a cylinder head cover structure for an engine is provided below.

The cylinder head cover structure for the engine includes: a cylinder head cover covering a top of a cylinder head of the engine, and defining a cam housing between the cylinder head and the cylinder head cover; an oil separator provided to an interior of the cylinder head cover, and including an oil separating chamber separately defined from the cam housing, the oil separating chamber separating and removing oil mist contained in blow-by gas; and a positive crankcase ventilation (PCV) valve releasing the blow-by gas, from which the oil mist is separated and removed in the oil separating chamber, from the oil separating chamber to an intake system of the engine, wherein the PCV valve is located between a portion of a defining wall and an exterior wall of the cylinder head cover, and supported by the defining wall and the exterior wall, the defining wall defining the oil separating chamber and the cam housing, and the exterior wall being spaced apart from the portion of the defining wall, and the PCV valve is surrounded by a space communicating with the cam housing.

The above features allow the space to receive oil splashed from the cam housing and hot air coming from the cam housing. The oil and the hot air heat a portion of the PCV valve between the defining wall and the exterior wall of the cylinder head cover. A valve body, that is, an operating part of the PCV valve, is usually located in the portion of the PCV valve. Hence, this valve body can be efficiently heated. Therefore, the features can effectively keep the PCV valve from freezing and defrost the PCV valve quickly when frozen.

In an embodiment of the structure, the PCV valve may be inserted into a first insert hole provided to the defining wall and a second insert hole provided to the exterior wall of the cylinder head cover. The structure may further include: a first sealing member provided between an outer circumferential face of the PCV valve and an inner circumferential face of the first insert hole; and a second sealing member provided between the outer circumferential face of the PCV valve and an inner circumferential face of the second insertion hole.

Such features allow the first sealing member to (i) keep the oil in the space from entering the oil separating chamber through a gap between the outer circumferential face of the PCV valve and the inner circumferential face of the first insert hole, and (ii) keep the blow-by gas (in particular, the blow-by gas from which the oil mist is separated and removed) in the oil separating chamber from leaking into the space. Moreover, the features allow the second sealing member to keep the oil in the space from leaking out of the cylinder head cover through a gap between the outer circumferential face of the PCV valve and the inner circumferential face of the second insertion hole.

In another embodiment, the structure may further include: a protector provided above the space to reduce a risk that fuel piping collides with a cowl member of a vehicle having the engine when the vehicle is in a collision causing the engine to recede, the fuel piping being provided above the cylinder head cover and closer to a front of the vehicle than the space is; and a ceiling wall, for the space, functioning as a reinforcement of the protector.

Such features allow the protector to be easily reinforced, using the ceiling wall for the space. This reinforcement can effectively reduce the risk of leaking fuel when the vehicle is in a collision.

In still another embodiment of the structure, the engine may include a supercharger. The structure may further include a passage provided to the interior of the cylinder head cover and arranged in parallel with the space, and, when the supercharger supercharges the engine, the passage may allow the blow-by gas, from which the oil mist is separated and removed in the oil separating chamber, to flow back from the oil separating chamber to the intake system of the engine without passing through the PCV valve.

Similar to the case when the engine is not supercharged by the supercharger, such features allow the blow-by gas to flow from the oil separating chamber back to the intake system of the engine even when the engine is supercharged.

BRIEF DESCRIPTION OF THE DRAWINGS

FIG. 1A is a schematic view of an engine to which a cylinder head cover structure according to a first exemplary embodiment is applied, the view illustrating flows of fresh air and blow-by gas when the engine is not supercharged.

FIG. 1B is a view corresponding to FIG. 1A and illustrating flows of the fresh air and the blow-by gas when the engine is supercharged.

DETAILED DESCRIPTION

Figure 2:
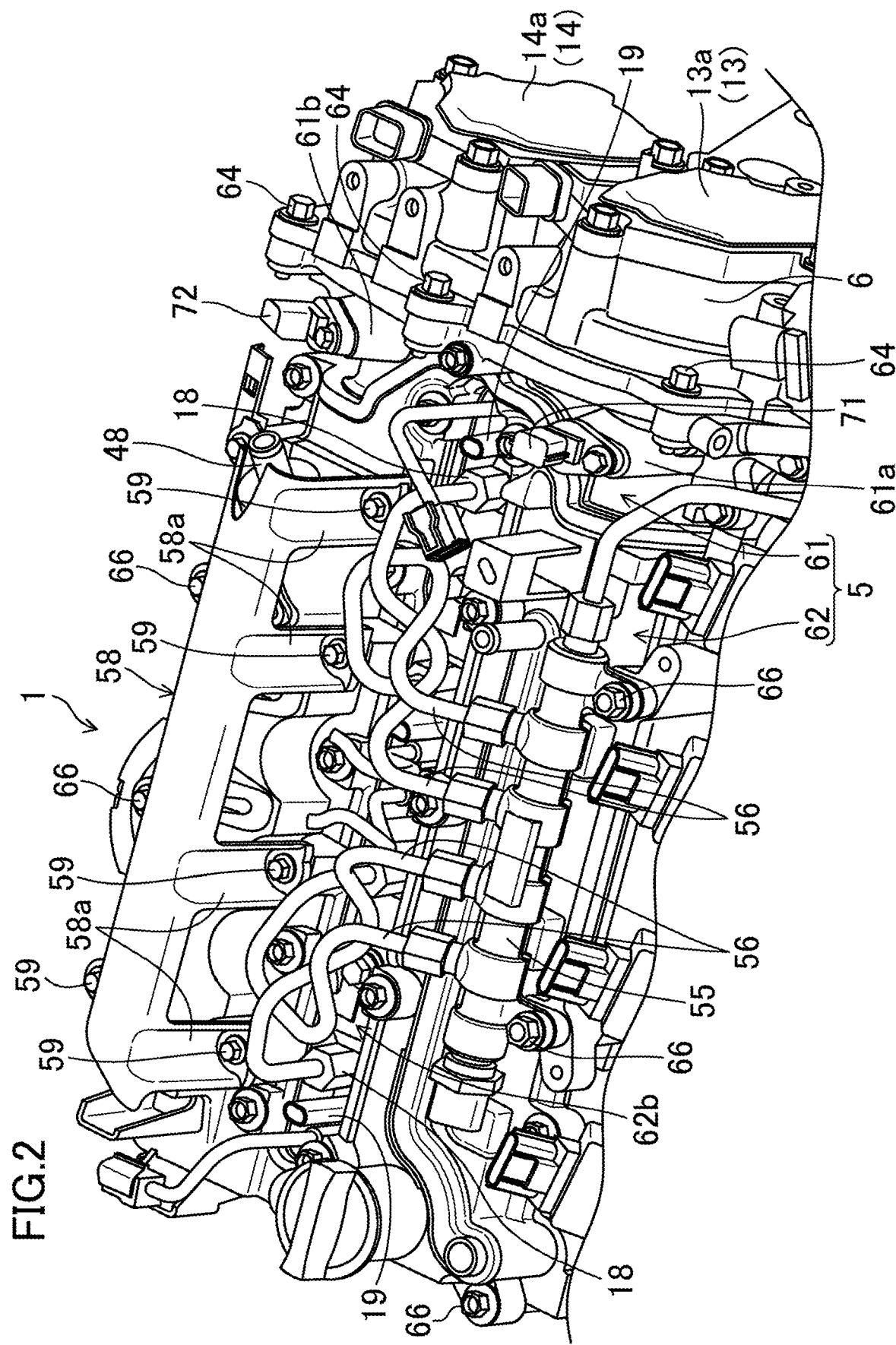
FIG. 2 is a perspective view illustrating an upper portion of the engine.

Exemplary embodiments will now be described in detail with reference to the drawings.

First Exemplary Embodiment

FIGS. 1A and 1B illustrate a schematic configuration of an engine 1 to which a cylinder head cover structure according to a first exemplary embodiment is applied. In this exemplary embodiment, the engine 1 is an in-line four-cylinder engine transversely mounted in an engine compartment located in the front of a vehicle, such that a crankshaft 9 extends along the width of the vehicle (i.e., perpendicular to drawing planes of FIGS. 1A and 1B).

The engine 1 includes: a cylinder block 3 in which four cylinders 2 (FIGS. 1A and 1B illustrate one cylinder alone) are arranged in line along the axis of the crankshaft 9; a cylinder head 4 provided on the cylinder block 3; and a cylinder head cover 5 covering a top of this cylinder head 4 and defining a cam housing 41 between the cylinder head cover 5 and the cylinder head 4. A piston 8 is reciprocatably inserted into each of the cylinders 2. The piston 8 in each cylinder 2 is connected to the crankshaft 9 via a connecting rod (not shown).

Although not shown, the cylinder head 4 has: an intake port and an exhaust port formed for each cylinder 2 to communicate with a combustion chamber 10; and an intake valve and an exhaust valve provided for each cylinder 2 to open and close openings, of the intake port and the exhaust port, toward the combustion chamber 10.

Between the upper portion of the cylinder head 4 and the lower portion of the cylinder head cover 5, an intake camshaft 11 and an exhaust camshaft 12 are arranged to extend along the axis of the crankshaft 9. The intake camshaft 11 is provided with cams to open and close the intake valves of all the cylinders 2. The exhaust camshaft 12 is provided with cams to open and close the exhaust valves of all the cylinders 2. Although not shown, a bearing rotatably supporting each of the intake camshaft 11 and the exhaust camshaft 12 is supplied with oil as lubricating oil. Furthermore, the cams for each of the intake camshaft 11 and the exhaust camshaft 12 are supplied with oil in drops through a shower head provided above the cams.

Timing at which the intake valve and the exhaust valve open is made variable by each of a variable valve timing (VVT) mechanism 13 for intake and a VVT mechanism 14 for exhaust illustrated in FIG. 2. In this exemplary embodiment, the VVT mechanism 13 for intake and the VVT mechanism 14 for exhaust are electric VVT mechanisms. The VVT mechanism 13 includes a VVT motor 13a for intake to vary the timing of opening the intake valve, and the VVT mechanism 14 includes a VVT motor 14a for exhaust to vary the timing of opening the exhaust valve. Examples of the VVT motors 13a and 14a include stepping motors. These VVT motors 13a and 14a are each mounted on and fastened to an exterior face of a chain cover 6 described below. The VVT motor 13a is positioned in an extension of the shaft center of the intake camshaft 11. The VVT motor 14a is positioned in an extension of the shaft center of the exhaust camshaft 12.

Moreover, the cylinder head 4 is provided with an injector 18 for each cylinder 2 to inject fuel. This injector 18 has a fuel injection nozzle provided to a ceiling face of the combustion chamber 10 to be oriented to the combustion chamber 10. The injector 18 injects and supplies the fuel directly to the combustion chamber 10 when the piston 8 reaches near the top dead center during the compression stroke.

An intake passage 21 is connected to a face, of the cylinder head 4, toward the front of the vehicle to communicate with the intake port of the cylinder 2. This intake passage 21 is provided with an air cleaner 22, a throttle valve 23, and a supercharger 24 in order from upstream. The supercharger 24 supercharges the combustion chamber 10 with intake air. An intake manifold 26 is provided downstream of the intake passage 21. The intake manifold 26 branches into independent passages each provided to a corresponding one of the cylinders 2. Each independent passage has a downstream end connected to the intake port of the corresponding cylinder 2.

Although not shown, an exhaust passage is connected to a face, of the cylinder head 4, toward the rear of the vehicle. The exhaust passage expels exhaust gas from the combustion chamber 10 of the cylinder 2. An exhaust manifold is provided upstream of this exhaust passage. The exhaust manifold includes independent passages each provided to a corresponding one of the cylinders 2 and connected to the exhaust port, and a collector in which the independent passages collect.

The cylinder head cover 5 is formed into a closed-end tube having a top closed and a bottom opened. The cylinder head cover 5 is secured to a top end of the cylinder head 4 to cover the tops of the intake camshaft 11 and the exhaust camshaft 12.

An interior of the cylinder head cover 5 is provided with a first oil separator 31. This first oil separator 31 includes an oil separating chamber 32 for separating and removing oil mist contained in blow-by gas. This oil separating chamber 32 is separately defined from the cam housing 41 in which the intake camshaft 11 and the exhaust camshaft 12 are provided. The oil separating chamber 32 has an outlet 34 (see FIG. 5) provided with a PCV valve 44 releasing the blow-by gas, from which the oil mist is separated and removed in the oil separating chamber 32, from the oil separating chamber 32 through a blow-by gas passage 43 to an intake system (i.e., a portion between the throttle valve 23 and the supercharger 24 in the intake passage 21) of the engine 1.

The PCV valve 44 functions as a blow-by gas flow rate control valve. When the engine 1 is not supercharged by the supercharger 24 as illustrated in FIG. 1A, a pressure to a downstream side of the throttle valve 23 in the intake passage 21 becomes negative. This negative pressure causes the blow-by gas to flow back through the blow-by gas passage 43 to the portion between the throttle valve 23 and the supercharger 24 in the intake passage 21. An opening of the PCV valve 44 varies depending on a degree of the negative pressure. The larger the absolute value of the negative pressure is, the smaller the opening of the PCV valve 44 becomes and the smaller the amount of the blow-by gas to flow back is.

In this exemplary embodiment, a fresh air introduction passage 28 branches off from the portion between the air cleaner 22 and the throttle valve 23 in the intake passage 21. The fresh air introduction passage 28 is for introducing fresh air into a lower portion of the cylinder block 3. The fresh air introduced into the lower portion of this cylinder block 3 keeps the oil from degrading. The fresh air introduction passage 28 runs through (i) an oil separating chamber 52 of a second oil separator 51 provided to an exterior of the cylinder head cover 5 and (ii) the cylinder head 4, and reaches the lower portion of the cylinder block 3 (below the piston 8). When the engine 1 is not supercharged, the fresh air is introduced into the combustion chamber 10 and a pressure in a lower portion of the cylinder block 3 becomes negative. Hence, as illustrated in FIG. 1A, the fresh air is introduced into the lower portion of the cylinder block 3 through the fresh air introduction passage 28. Together with the blow-by gas, the introduced fresh air flows back through the oil separating chamber 32 of the first oil separator 31 and the blow-by gas passage 43 into the portion between the throttle valve 23 and the supercharger 24 in the intake passage 21.

Meanwhile, when the engine 1 is supercharged by the supercharger 24 as illustrated in FIG. 1B, the throttle valve 23 is in a full open position such that the pressure to the downstream side of the throttle valve 23 in the intake passage 21 becomes equal to the atmospheric pressure. This does not allow the blow-by gas to flow back through the blow-by gas passage 43 to the portion between the throttle valve 23 and the supercharger 24 in the intake passage 21. However, the pressure in the lower portion of the cylinder block 3 becomes positive. Thus, the blow-by gas flows backward through the fresh air introduction passage 28 into the portion between the air cleaner 22 and the throttle valve 23 in the intake passage 21. (The fresh air is not introduced into the lower portion of the cylinder block 3.) In this case, the blow-by gas passes through the oil separating chamber 52 of the second oil separator 51. This oil separating chamber 52 is configured in a similar manner as the oil separating chamber 32 of the first oil separator 31. (Note that the oil separating chamber 52 is not provided with such a valve as the PCV valve 44 provided to the outlet 34 of the oil separating chamber 52.) In this oil separating chamber 52, the oil mist contained in the blow-by gas is separated and removed. Hence, also when the engine 1 is supercharged, the blow-by gas from which the oil mist is separated and removed can flow back into the intake system of the engine 1.

As illustrated in FIG. 2, a fuel rail 55 is provided above the cylinder head cover 5 (specifically, a resin cover member 62 described below) to the front of the vehicle. The fuel rail 55 extends along the axis of the crankshaft 9 (along the width of the vehicle). At one end, four fuel pipes 56 are connected to the fuel rail 55. At the other end, each of the fuel pipes 56 is connected to a corresponding one of the injectors 18 of the cylinders 2. The fuel rail 55 and the fuel pipes 56 correspond to fuel piping provided above the cylinder head cover 5 and closer to the front of the vehicle than a space 84 (described below) is.

The fuel rail 55 and the one end of each four fuel pipe 56 are positioned approximately as high as a cowl member 60 (see FIG. 6) positioned to the rear of the vehicle with respect to the engine 1 of the vehicle. Hence, when the vehicle is in a collision (in a front collision) causing the engine 1 to recede, the fuel piping could collide with the cowl member 60.

Figure 6:
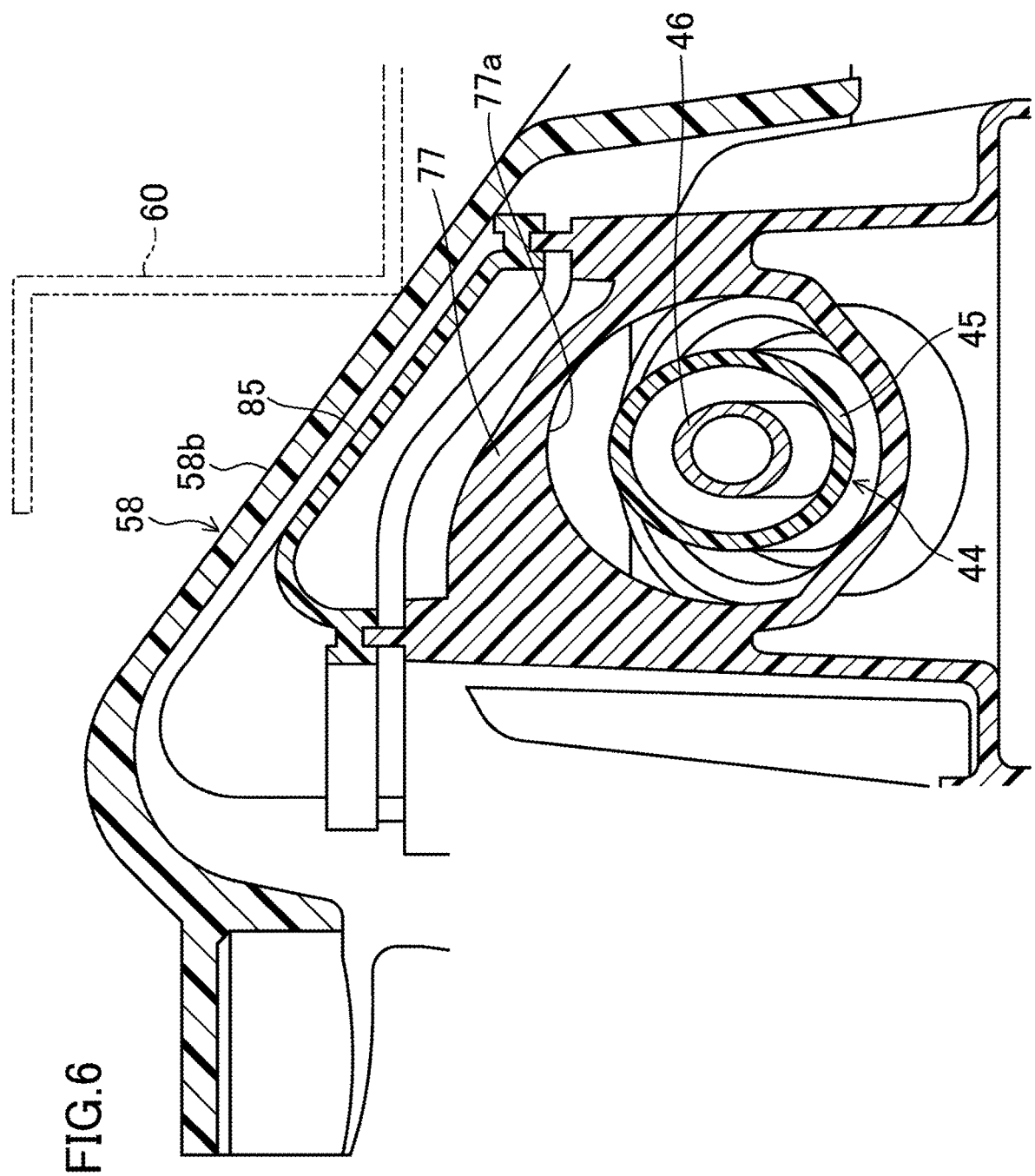
FIG. 6 is a cross-sectional view taken along line VI-VI of FIG. 5.

Hence, in this exemplary embodiment, a protector 58 is provided between the fuel piping and the cowl member 60, specifically above the cylinder head cover 5 (specifically, the resin cover member 62 described below) to the rear of the vehicle. The protector 58 extends along the width of the vehicle, and reduces the risk that the fuel piping collides with the cowl member 60 when the vehicle is in a collision. This protector 58 is fastened with bolts 59 to the top face of the cylinder head cover 5 via legs 58a extending downward. A face of the protector 58 to the rear of the vehicle is an inclined face 58b (see FIG. 6) inclined downward toward the rear of the vehicle. As illustrated in FIG. 6, when the cowl member 60 comes into contact with the face of the protector 58 to the rear of the vehicle while the engine 1 recedes, the inclined face 58b allows the cowl member 60 to move relatively upward with respect to the protector 58. Hence, the positions in height of the fuel piping and the cowl member 60 shift from each other such that the fuel piping and the cowl member 60 keep from colliding with each other.

Here, the "rear" of the engine 1 is to the output side (in the right of FIGS. 2 and 3) of the crankshaft 9 toward a transmission described below. The "front" of the engine 1 is opposite (in the left of FIGS. 2 and 3) the rear. The axial direction of the crankshaft 9 is also referred to as a longitudinal direction of the engine 1. Moreover, when the engine 1 is viewed from the rear toward the front, the left of the engine 1 is referred to as the "left", the right of the engine 1 is referred to as the "right", and the transverse direction of the engine 1 is also referred to as the "width direction."

Described below is a specific configuration of the cylinder head cover 5, with reference to FIGS. 2 to 8.

In this exemplary embodiment, as illustrated in FIGS. 2 to 5 and 8, the cylinder head cover 5 includes two members, namely, a metal cover member 61 (made of aluminum alloy in this exemplary embodiment), and the resin cover member 62. The metal cover member 61 forms one end of the cylinder head cover 5 in the longitudinal direction of the engine 1 (also in the longitudinal direction of the cylinder head cover 5) and a portion adjacent to the one end. The resin cover member 62 forms a portion of the cylinder head cover 5 other than the one end and the portion adjacent to the one end. In this exemplary embodiment, the metal cover member 61 forms an end of the cylinder head cover 5 to the rear of the engine 1 (an end of the cylinder head cover 5 to the left of the vehicle), and a portion adjacent to the one end.

In this exemplary embodiment, an end face of the engine 1 to the rear (end faces of the cylinder block 3 and the cylinder head 4 to the rear of the engine 1) is provided with a chain 15 (see FIG. 8) and a chain cover 6 (see FIG. 2). The chain 15 drives the intake camshaft 11 and the exhaust camshaft 12 through the crankshaft 9. The chain cover 6 is made of metal, and covers the chain 15 from the rear of the engine 1. In this exemplary embodiment, the chain cover 6 is also made of aluminum alloy. An upper end of the chain cover 6 is attached and fastened with bolts 64 to an end face, of the metal cover member 61, to the rear of the engine 1.

Although not shown in this exemplary embodiment, the chain cover 6 is vertically separated into two pieces, namely, a head cover (an upper portion) corresponding to the cylinder head 4 and the cylinder head cover 5, and a block cover (a lower portion) corresponding to the cylinder block 3. The head cover, except for the upper end fastened to the metal cover member 61, is attached and fastened with bolts (not shown) to the cylinder head 4. The block cover is attached and fastened with bolts (not shown) to the cylinder block 3.

A transmission (an automatic transmission in this exemplary embodiment; not shown) is coupled through the block cover of the chain cover 6 to an end face of the cylinder block 3 to the rear of the engine 1. The crankshaft 9 is connected to an input shaft of the transmission such that the power of the engine 1 is transmitted to the transmission. As described above, the chain cover 6 is vertically separated into two pieces. That is why even though the engine 1 and the transmission are coupled to each other and mounted in the engine compartment, the head cover of the chain cover 6 may be removed from the cylinder head 4 and the metal cover member 61. Such a feature allows the chain 15 to be removed easily, so that the cylinder head 4 and/or a cylinder head gasket (not shown) sealing a space between the cylinder head 4 and the cylinder block 3 can be easily replaced with a new cylinder head and/or a new cylinder head gasket.

Figure 3:
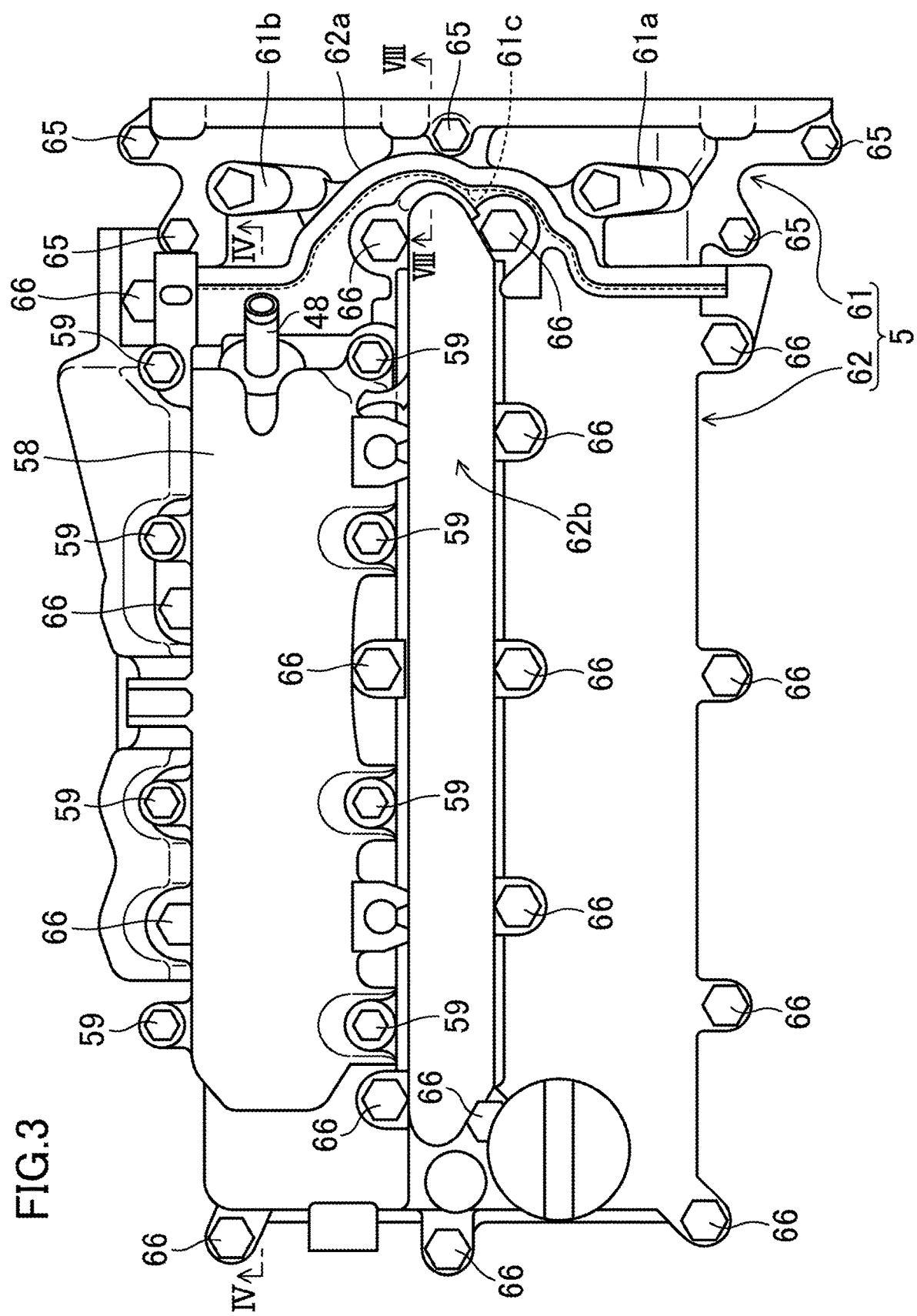
FIG. 3 is a plan view illustrating a cylinder head cover of the engine.

As illustrated in FIGS. 2 and 3, the metal cover member 61 is fastened with bolts 65 to the cylinder head 4. Moreover, the resin cover member 62 is fastened with bolts 66 to the cylinder head 4. In these fastening states, an end of the resin cover member 62 to the rear of the engine 1 and an end of the metal cover member 61 to the front of the engine 1 overlap so that the end of the resin cover member 62 is placed above the end of the metal cover member 61. A rubber gasket 68 is provided to a space between the overlapping ends of the metal cover member 61 and the resin cover member 62. (See FIGS. 4, 5, and 8.) The rubber gasket 68 seals the space. This rubber gasket 68 is an endless gasket, and seals a space between an outer periphery of a bottom face of the resin cover member 62 (except for the end of the resin cover member 62 to the rear of the engine 1) and the top face of the cylinder head 4. Note that liquid gasket is provided in a space between a bottom face of the metal cover member 61 and the cylinder head 4.

An intake cam angle sensor attachment 61a (see FIGS. 2 and 3) is provided to the metal cover member 61, in an intermediate portion of the engine length direction, to the left of the engine 1 (to the front of the vehicle). The intake cam angle sensor attachment 61a is provided with an intake cam angle sensor 71 detecting a rotational position of the intake camshaft 11. An exhaust cam angle sensor attachment 61b (see FIGS. 2 and 3) is provided to the metal cover member 61, in the intermediate portion of the engine length direction, to the right of the engine 1 (to the rear of the vehicle). The exhaust cam angle sensor attachment 61b is provided with an exhaust cam angle sensor 72 detecting a rotational position of the exhaust camshaft 12. A recess 61c is formed on an end of the metal cover member 61, in the center in the engine width direction, to the front of the engine 1. The recess 61c is notched to the rear of the engine 1, and located between the intake cam angle sensor attachment 61a and the exhaust cam angle sensor attachment 61b.

Figure 8:
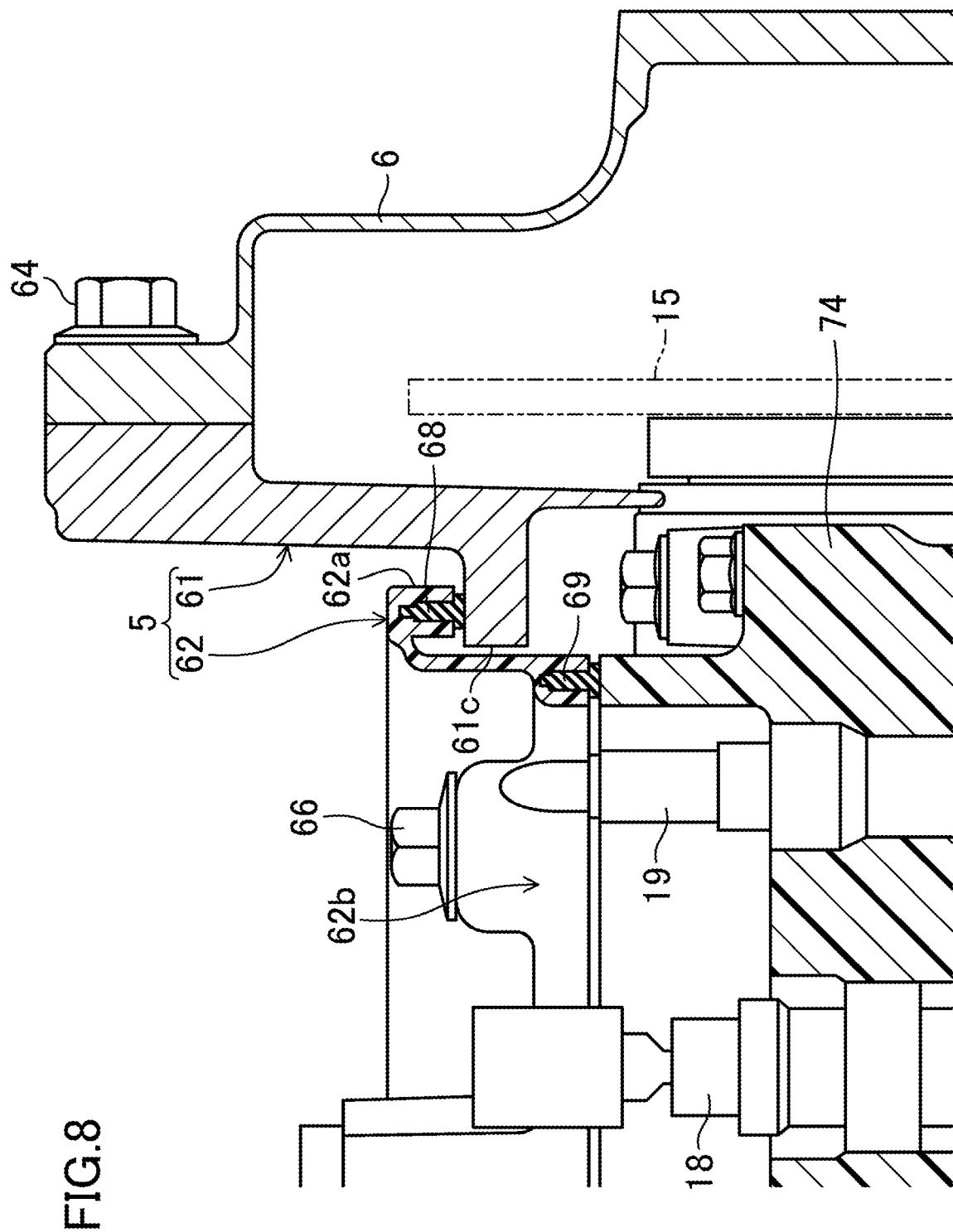
FIG. 8 is a cross-sectional view of a metal cover member, a resin cover member, a chain cover, and a holder of the cylinder head cover, the view being taken along line VIII-VIII of FIG. 3.

A protrusion 62a is formed on an end of the resin cover member 62, in the center in the engine width direction, to the rear of the engine 1. When the metal cover member 61 and the resin cover member 62 are fastened to the cylinder head 4, the protrusion 62a conforms to the recess 61c of the metal cover member 61 and protrudes to the rear of the engine 1. This protrusion 62a is provided to the resin cover member 62 in the transverse center of the engine 1 to form a slot 62b extending in the longitudinal direction of the engine 1. Specifically, as illustrated in FIG. 8, the slot 62b includes therein the injector 18 of each cylinder 2 and a top end of a cylinder pressure sensor 19 detecting a pressure inside each of the cylinder 2. An end of the slot 62b to the rear of the engine 1 is located to be able to accommodate the injector 18 and the cylinder pressure sensor 19 for the rearmost cylinder 2 of the engine 1. That is why the protrusion 62a is formed. The injectors 18 and the cylinder pressure sensors 19 for all of the cylinders 2 are vertically inserted through and held with a holder 74 provided below, and blocking, the slot 62b. A rubber gasket 69 (see FIG. 8) is provided to a space between a top face of the holder 74 and a bottom face of a periphery of the slot 62b of the resin cover member 62. The rubber gasket 69 seals the space.

The first oil separator 31 is provided to the interior of the resin cover member 62. The second oil separator 51 is provided to the exterior of the resin cover member 62. Described here in detail is a configuration of the first oil separator 31. The second oil separator 51 is similar in configuration to the first oil separator 31, and the detailed description thereof shall be omitted. Furthermore, the second oil separator 51 is illustrated in a simplified manner in FIGS. 1A and 1B, and an illustration of a detailed shape of the second oil separator 51 shall also be omitted.

Figure 4:
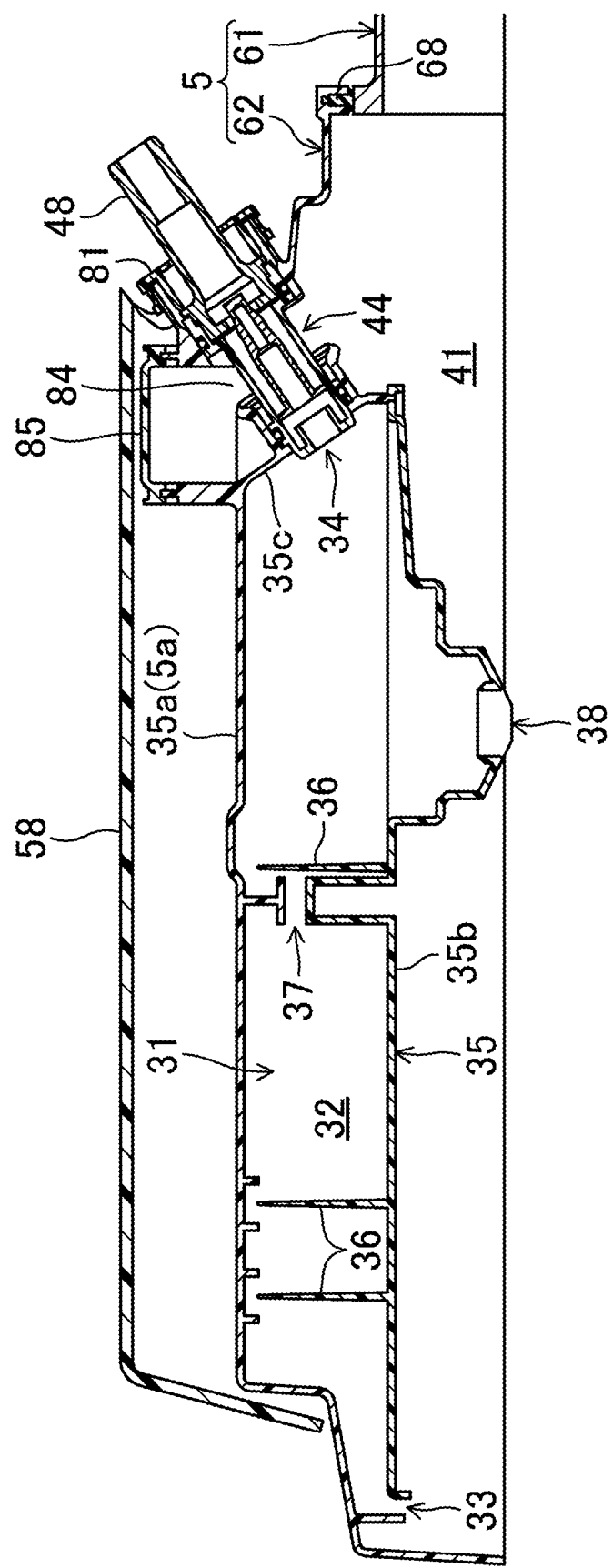
FIG. 4 is a cross-sectional view taken along line IV-IV of FIG. 3.

As illustrated in FIG. 4, the oil separating chamber 32 of the first oil separator 31 is provided to the interior of the cylinder head cover 5 (specifically, the resin cover member 62) to the right of the engine 1 (to the rear of the vehicle). This oil separating chamber 32 is defined by a defining wall 35. This defining wall 35 includes (i) a portion to be also used as an exterior wall 5a (hereinafter referred to as a cover exterior wall 5a) of the cylinder head cover 5, as a ceiling wall 35a of the oil separating chamber 32, and (ii) a portion made of a member other than the cover exterior wall 5a as a bottom wall 35b of the oil separating chamber 32. The oil separating chamber 32 is elongated to extend in the longitudinal direction of the engine 1 (in the longitudinal direction of the cylinder head cover 5). An inlet 33 of the oil separating chamber 32 is provided to an end of the bottom wall 35b of the oil separating chamber 32 to the front of the engine 1. Through this inlet 33, the blow-by gas enters the oil separating chamber 32.

Figure 5:
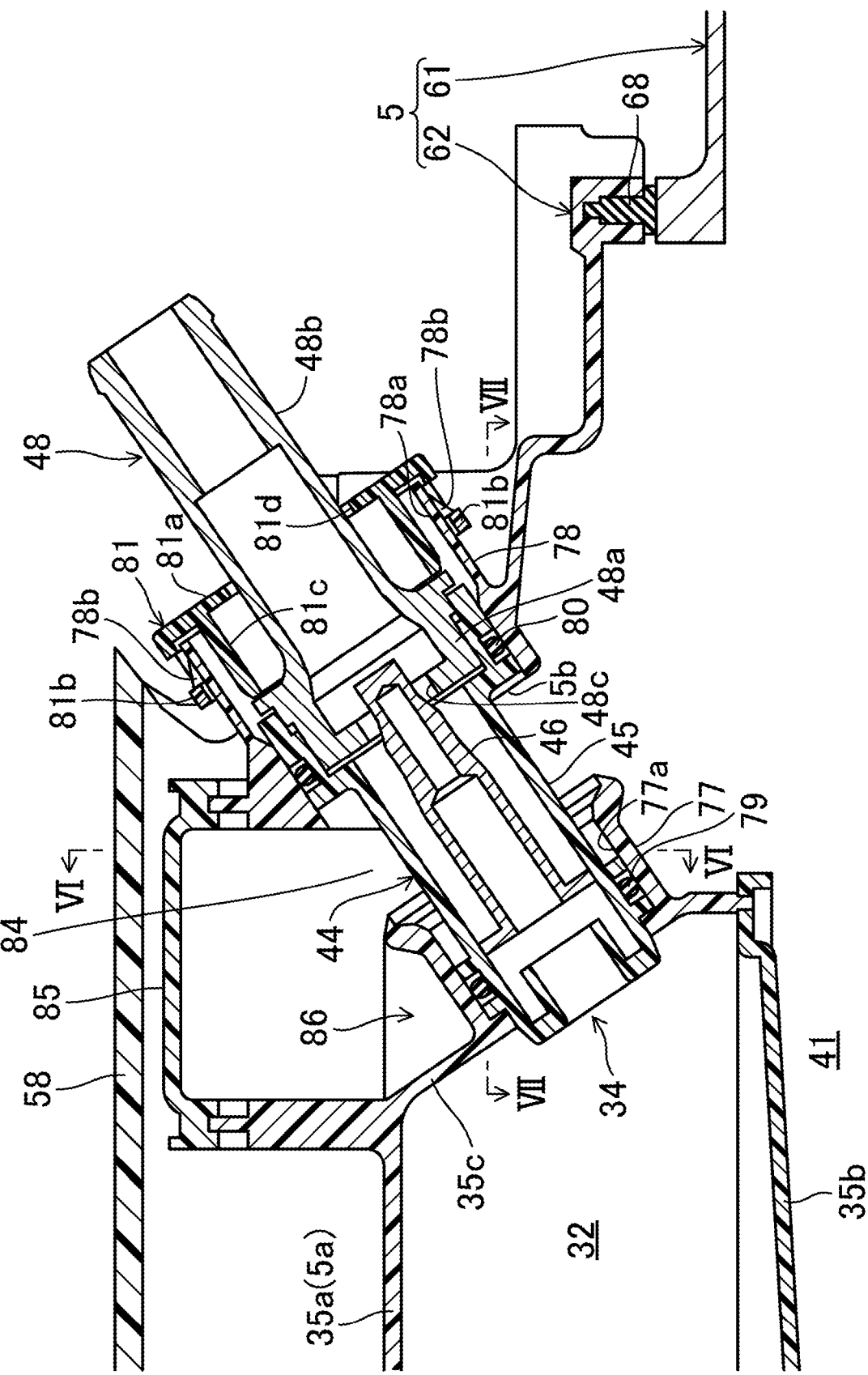
FIG. 5 is an enlarged cross-sectional view illustrating in close-up the vicinity of a PCV valve in FIG. 3.

Moreover, as illustrated in FIG. 5, a side wall 35c (i.e., a portion of the defining wall 35) of the oil separating chamber 32 to the rear of the engine 1 inclines upward toward the front of the engine 1. The side wall 35c is integrally formed with the cover exterior wall 5a. This side wall 35c is provided with the outlet 34 of the oil separating chamber 32 and the PCV valve 44. The bottom wall 35b and the side wall 35c correspond to a defining wall defining the oil separating chamber 32 and the cam housing 41. The side wall 35c corresponds to a portion of the defining wall defining the oil separating chamber 32 and the cam housing 41. Hereinafter, this side wall 35c is referred to as a valve providing side wall 35c.

Vertical walls 36 which the blow-by gas hits are provided to an interior of the oil separating chamber 32 to the front of the engine 1. Moreover, a choke 37 is provided to the oil separating chamber 32 in the center of the engine length direction. The choke 37 increases a flow rate of the blow-by gas. One of the vertical walls 36 is provided downstream of the choke 37 so that the blow-by gas flowing out of the choke 37 hits. When the blow-by gas hits the vertical walls 36, the oil mist separates from the blow-by gas. The separated oil mist flows out of an oil outlet 38, provided to the bottom wall 35b, into the cam housing 41.

A side wall opposing face 5b of the cover exterior wall 5a is located above the valve providing side wall 35c to the rear of the engine 1. The side wall opposing face 5b is spaced opposite from the valve providing side wall 35c. The PCV valve 44 is located between the valve providing side wall 35c and the side wall opposing face 5b, and supported by the valve providing side wall 35c and the side wall opposing face 5b.

The valve providing side wall 35c is provided with a first cylinder 77 extending in a direction in which the valve providing side wall 35c and the side wall opposing face 5b face each other. This first cylinder 77 has a through hole 77a into which a case 45 provided for the PCV valve 44 and shaped into a cylinder is inserted. Moreover, the side wall opposing face 5b is also provided with a second cylinder 78 extending in a direction in which the valve providing side wall 35c and the side wall opposing face 5b face each other. The case 45 is inserted also into a through hole 78a of this second cylinder 78. Hence, the case 45 is supported by the valve providing side wall 35c and the side wall opposing face 5b while inserted into the through hole 77a (corresponding to a first insert hole) provided to the valve providing side wall 35c and the through hole 78a (corresponding to a second insert hole) provided to the side wall opposing face 5b. In this exemplary embodiment, the outlet 34 of the oil separating chamber 32 is a portion of the through hole 77a to the interior (close to the oil separating chamber 32) of the cylinder head cover 5.

A first sealing member 79, namely an O-ring, is provided to a space between an outer circumferential face of the PCV valve 44 (an outer circumferential face of the case 45) and an inner circumferential face of the through hole 77a. A second sealing member 80, namely an O-ring, is provided to a space between the outer circumferential face of the PCV valve 44 (the outer circumferential face of the case 45) and an inner circumferential face of the through hole 78a.

A large-diameter portion 48a of a pipe 48 is inserted into an opening end of the case 45 to the exterior of the cylinder head cover 5. The pipe 48 is a portion of the blow-by gas passage 43. This large-diameter portion 48a is provided to an end of the pipe 48 to the interior of the cylinder head cover 5. The large-diameter portion 48a is larger than a small-diameter portion 48b, namely, other portions of the pipe 48 than the large-diameter portion 48a. A cap 81 engages with an end of the second cylinder 78 to the exterior of the cylinder head cover 5 so that the large-diameter portion 48a does not come off the opening end. This cap 81 includes: a circular plate 81a; engagement portions 81b provided to circumferential portions of an outer periphery of the circular plate 81a and engaging with engagement hooks 78b provided to an outer circumferential face of the second cylinder 78; and a stopper 81c extending from the circular plate 81a toward the interior of cylinder head cover 5. An insertion hole 81d is formed in the center of the circular plate 81a, so that the small-diameter portion 48b of the pipe 48 is inserted in the insertion hole 81d. When the engagement portions 81b and the engagement hooks 78b engage with each other, the stopper 81c keeps the large-diameter portion 48a from coming off the opening end. Moreover, the small-diameter portion 48b of the pipe 48 protrudes from the insertion hole 81d toward the exterior of the cylinder head cover 5. A hose (not shown) is connected to an end of the pipe 48 to the exterior of the cylinder head cover 5. The hose, namely the blow-by gas passage 43, connects the pipe 48 and the portion between throttle valve 23 and the supercharger 24 in the intake passage 21.

The large-diameter portion 48a of the pipe 48 is formed into a closed-end tube having an end closed and an other end opened. On the closed end, a communication hole 48c is formed to provide communication between the interior of the pipe 48 and the interior of the case 45. The case 45 houses a valve body 46 so that the valve body 46 can extend and move along the cylindrical axis of the case 45 (in the direction in which the valve providing side wall 35c and the side wall opposing face 5b face each other). This valve body 46 is positioned inside the case 45 between the valve providing side wall 35c and the side wall opposing face 5b. The valve body 46 has a tip end (an end to the exterior of the cylinder head cover 5) inserted in the communication hole 48c. The tip end of the valve body 46 tapers so that the diameter of the tip end becomes gradually smaller toward the tip. Such a feature makes the opening of the PCV valve 44 smaller as the tip end of the valve body 46 is inserted further into the communication hole 48c.

The valve body 46 is biased toward the interior of the cylinder head cover 5 by, for example, a helical compression spring (not shown) provided around the valve body 46 in the case 45. By the negative pressure of the intake passage 21, the valve body 46 moves toward the exterior of the cylinder head cover 5 against the bias of the helical compression spring. Hence, the opening of the PCV valve 44 is smaller as an absolute value of the negative pressure is larger.

The blow-by gas from which the oil mist is separated and removed is ejected from the outlet 34 of the oil separating chamber 32. The blow-by gas then enters the case 45 of the PCV valve 44. After passing through the circumference of the valve body 46, the blow-by gas is introduced into the pipe 48 from the communication hole 48c. Running from the pipe 48 through the hose, the blow-by gas flows back to the portion between the throttle valve 23 and the supercharger 24 in the intake passage 21.

The PCV valve 44 between the valve providing side wall 35c and the side wall opposing face 5b is surrounded by the space 84 communicating with the cam housing 41. An opening above this space 84 is blocked by a block member 85. This block member 85 is configured as a ceiling wall for the space 84. As illustrated in FIG. 6, the block member 85 inclines in the vicinity of the inclined face 58b of the protector 58 to conform to the inclined face 58b. Such features allow the block member 85 (the ceiling wall for the space 84) to function as a reinforcement of the protector 58. Hence, when the cowl member 60 comes in contact with the protector 58, the block member 85 keeps the protector 58 from deforming and allows the cowl member 60 to more reliably move upward with respect to the protector 58.

Figure 7:
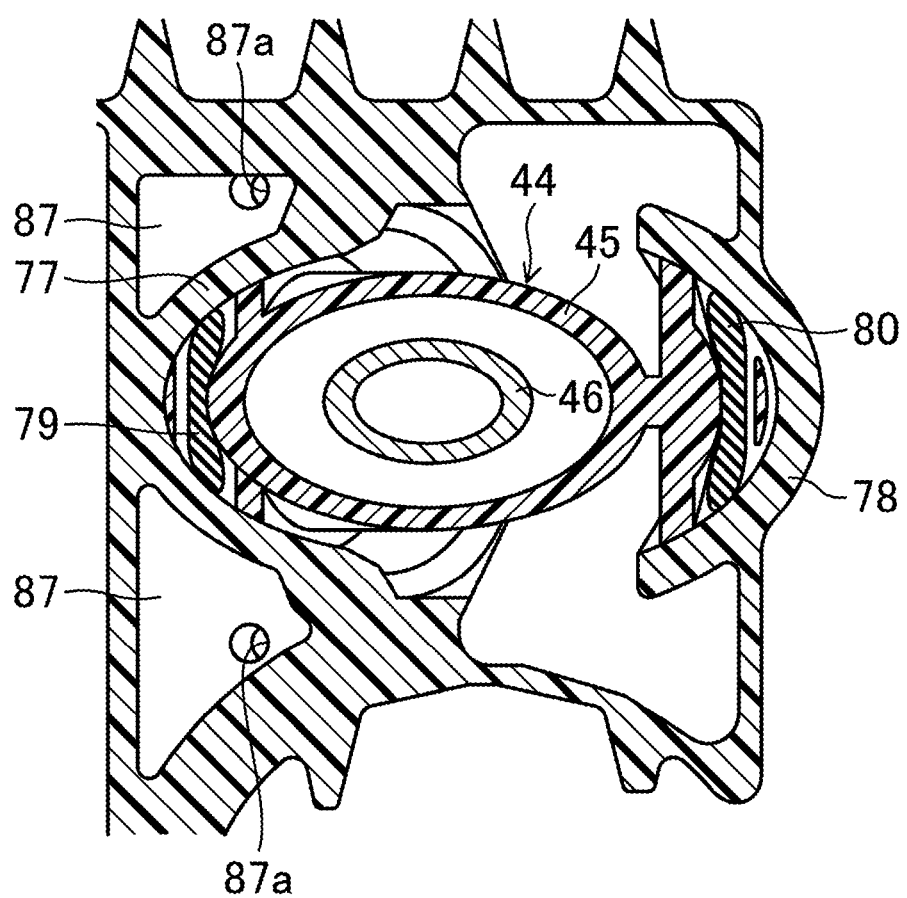
FIG. 7 is a cross-sectional view taken along line VII-VII of FIG. 5.

The space 84 receives the oil splashed from the cam housing 41 especially with the rotation of the cam of the exhaust camshaft 12. Some of this oil is drizzled on a peripheral side face of the case 45 of the PCV valve 44. Moreover, some of the oil splashed into the space 84 is caught in an oil reservoir 86 provided above the first cylinder 77 and recessed downward as illustrated in FIG. 5. As illustrated in FIG. 7, a recess 87 similar to the oil reservoir 86 is provided to each of the front and the rear with respect to the oil reservoir 86 along the longitudinal direction of the vehicle. A bottom of each recess 87 is provided with a through hole 87a for draining the oil. Through this through hole 87a, the oil splashed into the space 84 is brought back to the cam housing 41.

In cold weather, the valve body 46 of the PCV valve 44 could be less likely to operate smoothly because of frozen water contained in the blow-by gas adhering, especially, to the valve body 46.

Hence, in this exemplary embodiment, the space 84 communicating with the cam housing 41 is provided around the PCV valve 44 (the case 45) between the valve providing side wall 35c and the side wall opposing face 5b. This space 84 receives the oil splashed from the cam housing 41 and hot air coming from the cam housing 41. The oil and the hot air heat a portion, of the case 45 of the PCV valve 44, between the valve providing side wall 35c and the side wall opposing face 5b. The valve body 46, which tends to malfunction when frozen, is located inside the portion of the case 45. Hence, this valve body 46 can be efficiently heated. Hence, the space 84 can effectively keep the PCV valve 44 from freezing and defrost the PCV valve 44 quickly when frozen.

Second Exemplary Embodiment

Figure 9A:
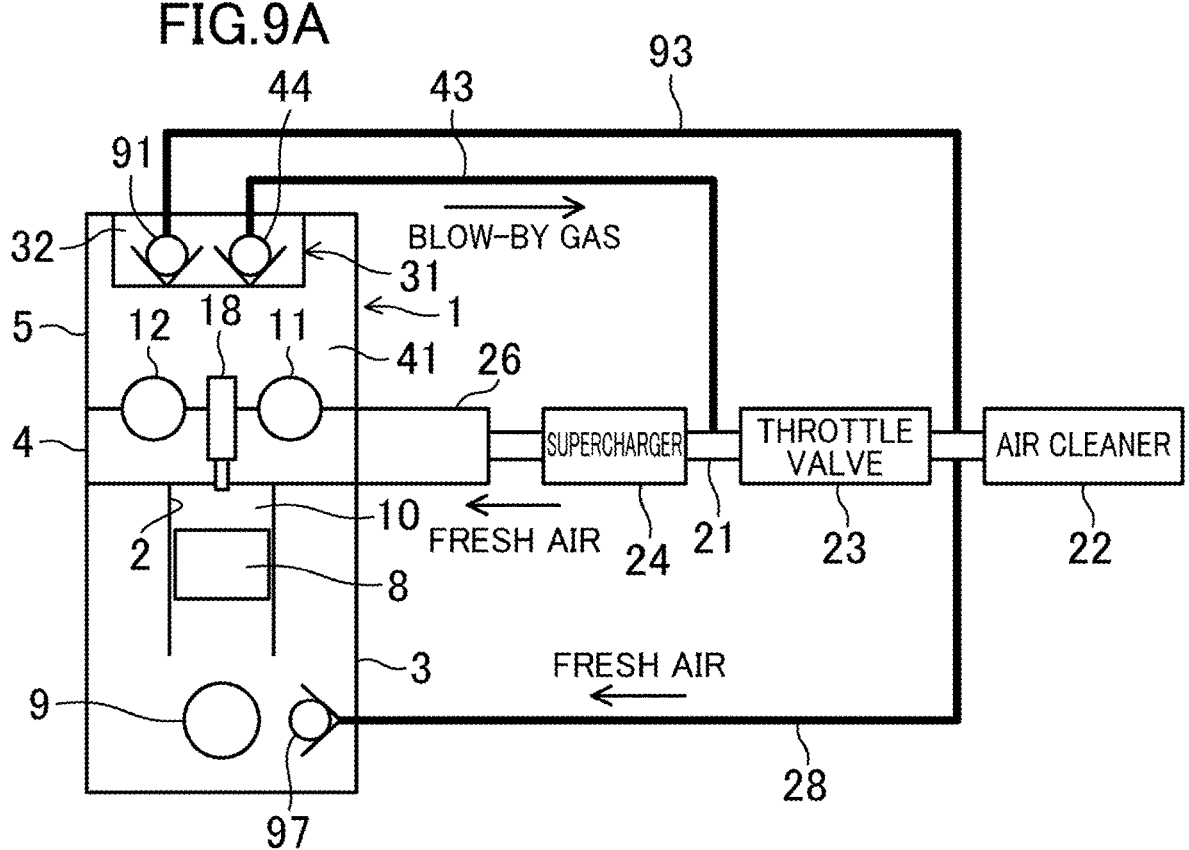
FIG. 9A is a schematic view of an engine to which a cylinder head cover structure according to a second exemplary embodiment is applied, the view illustrating flows of fresh air and blow-by gas when the engine is not supercharged.
Figure 9B:
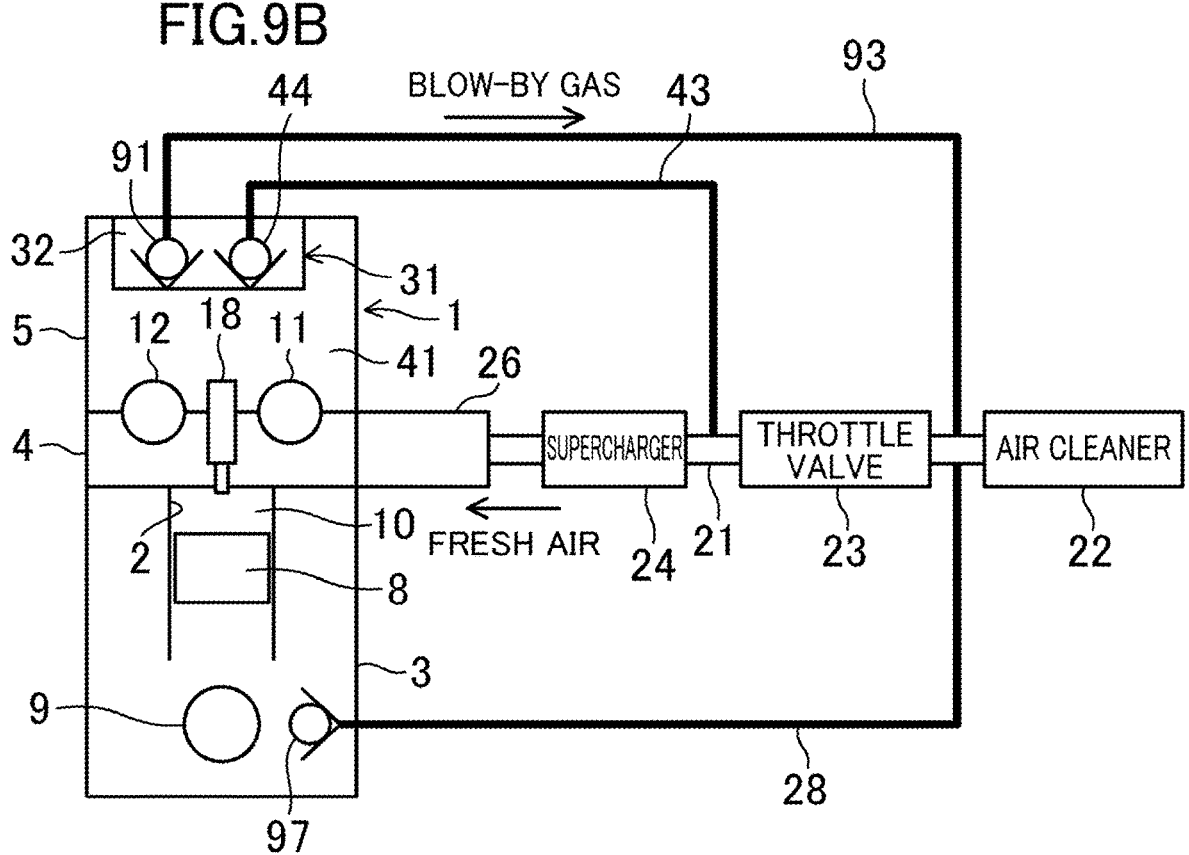
FIG. 9B is a view corresponding to FIG. 9A and illustrating flows of the fresh air and the blow-by gas when the engine is supercharged.

FIGS. 9A and 9B illustrate a second exemplary embodiment. The second exemplary embodiment is similar to the first exemplary embodiment in the backflow of the blow-by gas through the blow-by gas passage 43 when the engine 1 is not supercharged. When the engine 1 is supercharged, however, the second exemplary embodiment is different from the first exemplary embodiment in the backflow of the blow-by gas. Note that the same constituent elements between FIGS. 9A and 9B and FIGS. 1A and 1B share the same reference characters, and detailed description thereof shall be omitted.

In this exemplary embodiment, the second oil separator 51 is not provided; instead, the first oil separator 31 (hereinafter merely referred to as the oil separator 31) alone is provided. The valve providing side wall 35c is a side wall, of the oil separating chamber 32 for this oil separator 31, to the rear of the engine 1. The valve providing side wall 35c is provided with an outlet 92 (see FIG. 11) having a one-way valve 91, in addition to the outlet 34 having the PCV valve 44. Note that the one-way valve 91 is illustrated only in FIGS. 9A and 9B, and omitted in FIG. 11.

As described in the first exemplary embodiment, the outlet 34 provided with the PCV valve 44 is connected through the PCV valve 44 and the blow-by gas passage 43 (hereinafter referred to as a first blow-by gas 43) to the portion between the throttle valve 23 and the supercharger 24 in the intake passage 21. The outlet 92 provided with the one-way valve 91 is connected through the one-way valve 91 and a second blow-by gas passage 93 to the portion between the air cleaner 22 and the throttle valve 23 in the intake passage 21.

Moreover, in this exemplary embodiment, the fresh air introduction passage 28 branching off the portion between the air cleaner 22 and the throttle valve 23 in the intake passage 21 is connected to the lower portion of the cylinder block 3 without passing through the cylinder head cover 5 and the cylinder head 4. This connection is provided with a one-way valve 97.

When the engine 1 is not supercharged by the supercharger 24 as illustrated in FIG. 9A, similar to the first exemplary embodiment, the blow-by gas flows back from the oil separating chamber 32 through the PCV valve 44 and the first blow-by gas passage 43 to the portion between the throttle valve 23 and the supercharger 24 in the intake passage 21. Here, the fresh air tends to enter the oil separating chamber 32 through the second blow-by gas passage 93; however, the one-way valve 91 is closed such that the fresh air cannot enter the oil separating chamber 32. Moreover, the blow-by gas cannot flow into the second blow-by gas passage 93. Furthermore, when the engine 1 is not supercharged, the fresh air is introduced into the lower portion of the cylinder block 3 through the fresh air introduction passage 28.

Meanwhile, when the engine 1 is supercharged by the supercharger 24 as illustrated in FIG. 9B, similar to the first exemplary embodiment, the blow-by gas does not flow back through the first blow-by gas passage 43 to the portion between the throttle valve 23 and the supercharger 24 in the intake passage 21. However, the one-way valve 91 opens such that the blow-by gas flows back through the second blow-by gas passage 93 to the portion between the air cleaner 22 and the throttle valve 23 in the intake passage 21. Furthermore, when the engine 1 is supercharged, the one-way valve 97 is closed such that the fresh air is not introduced into the lower portion of the cylinder block 3 through the fresh air introduction passage 28.

Figure 10:
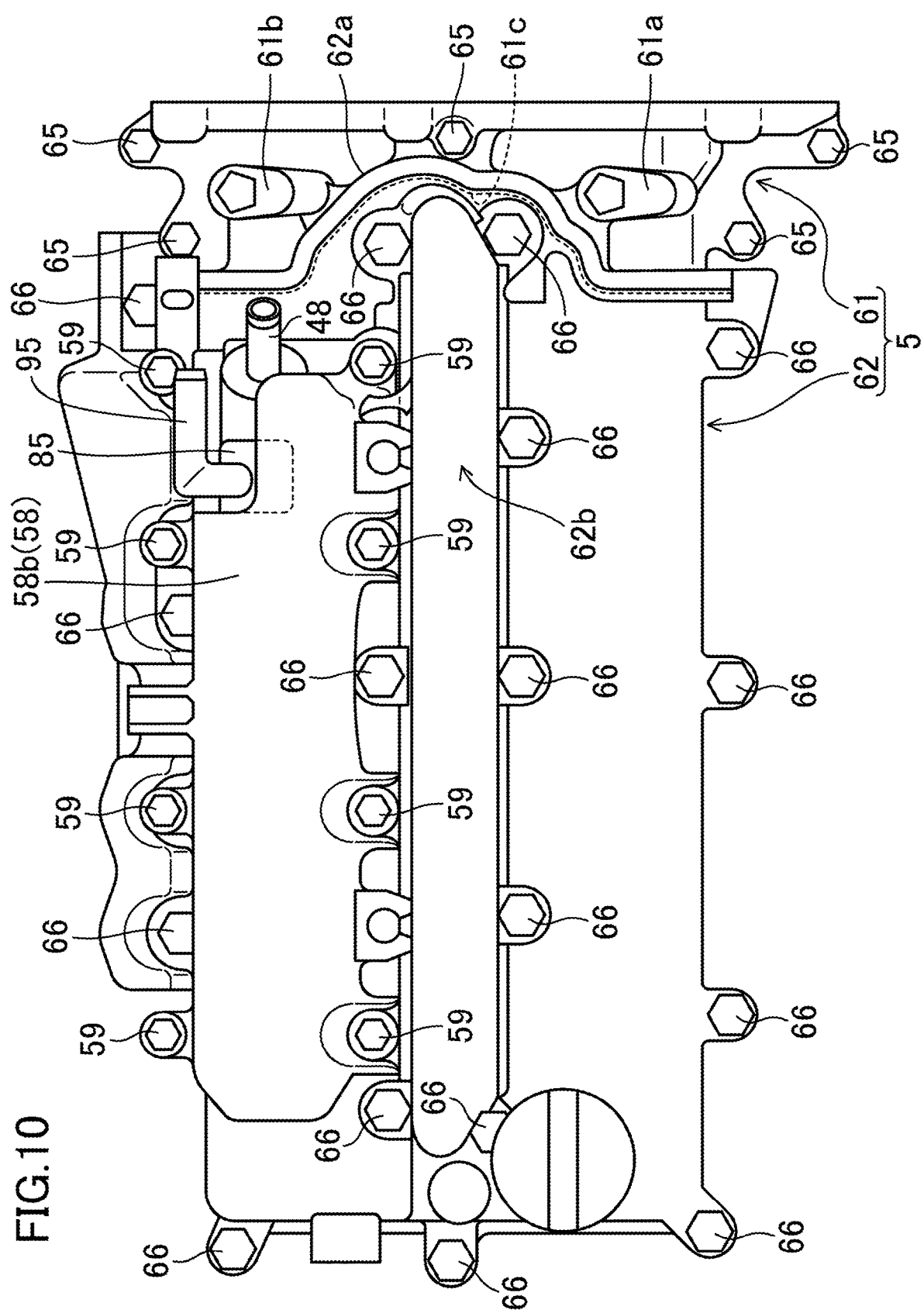
FIG. 10 is a view corresponding to FIG. 3 and illustrating a second exemplary embodiment.
Figure 11:
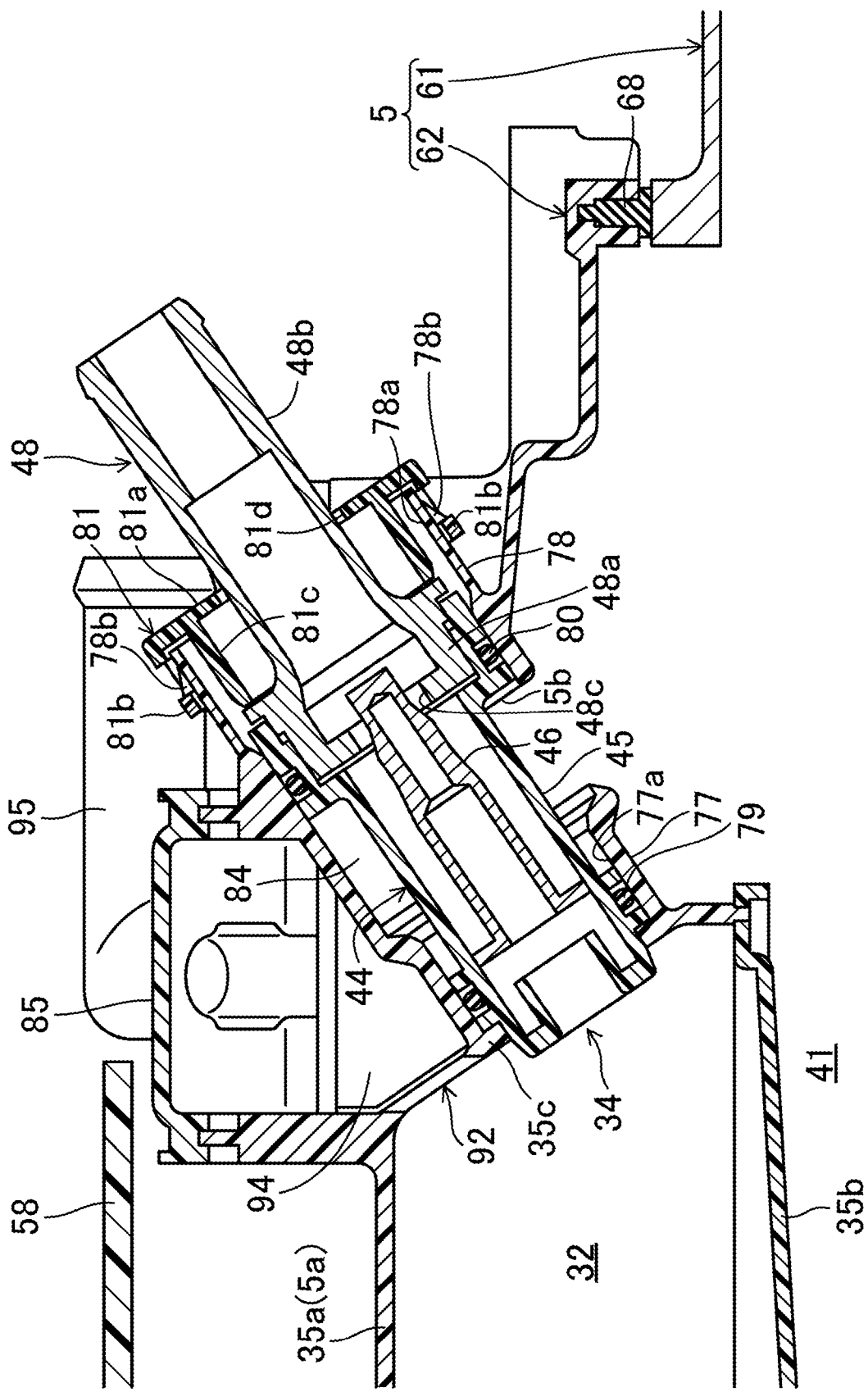
FIG. 11 is a view corresponding to FIG. 5 and illustrating the second exemplary embodiment.

Described below is a specific configuration of the cylinder head cover 5 in this exemplary embodiment, with reference to FIGS. 10 and 11.

In this exemplary embodiment, the space 84 in the first exemplary embodiment is vertically arranged into to two sections. The lower section of the two functions as the space 84. Similar to the first exemplary embodiment, the space 84 of this exemplary embodiment is also provided around the PCV valve 44 between the valve providing side wall 35c and the side wall opposing face 5b, and communicates with the cam housing 41. The ceiling wall for the space 84 is located substantially above the PCV valve 44.

A passage 94 is provided above the space 84. The passage 94 is a portion of the second blow-by gas passage 93. This passage 94 communicates with the outlet 92 provided above the outlet 34 having the PCV valve 44. The passage 94 is provided to the interior of the cylinder head cover 5, and arranged side by side with the space 84. When the supercharger 24 supercharges the engine 1, the passage 94 allows the blow-by gas, from which the oil mist is separated and removed in the oil separating chamber 32, to flow back from the oil separating chamber 32 to the intake system (the portion between the air cleaner 22 and the throttle valve 23 in the intake passage 21) of the engine 1 without passing through the PCV valve 44.

In this exemplary embodiment, the block member 85 is the ceiling wall for the passage 94. Similar to the first exemplary embodiment, also in this exemplary embodiment, the block member 85 inclines in the vicinity of the inclined face 58b of the protector 58 to conform to the inclined face 58b, and functions as a reinforcement of the protector 58.

A pipe 95 protruding is provided to the block member 85 on the exterior of the cylinder head cover 5 to communicate with the passage 94. This pipe 95 has a tip end connected to a hose (not shown) configured as the second blow-by gas passage 93 connecting the pipe 95 and the portion between the air cleaner 22 and the throttle valve 23 in the intake passage 21.

Hence, similar to the first exemplary embodiment, also in this embodiment, the space 84 communicating with the cam housing 41 is provided around the PCV valve 44 (the case 45) between the valve providing side wall 35*c* and the side wall opposing face 5*b*. Heated in the space 84 is the portion, of the case 45 of the PCV valve 44, between the valve providing side wall 35*c* and the side wall opposing face 5*b*. The valve body 46 is located inside the portion of the case 45. Hence, this valve body 46 can be efficiently heated.

The present invention is not limited to the exemplary embodiments described above. Any replacement may be made within the scope of the claims.

The embodiments described above are mere examples and are not to be construed as limiting the scope of the present invention. The scope of the present invention is defined by the appended claims, and all variations and modifications belonging to a range equivalent to the range of the claims are within the scope of the present invention.

What is claimed is:

1. A cylinder head cover structure for an engine, the structure comprising:
   - a cylinder head cover covering a top of a cylinder head of the engine, and defining a cam housing between the cylinder head and the cylinder head cover;
   - an oil separator provided to an interior of the cylinder head cover, and including an oil separating chamber separately defined from the cam housing, the oil separating chamber separating and removing oil mist contained in blow-by gas; and
   - a positive crankcase ventilation (PCV) valve releasing the blow-by gas, from which the oil mist is separated and removed in the oil separating chamber, from the oil separating chamber to an intake system of the engine via a blow-by gas passage, wherein
   - the PCV valve is located between a portion of a defining wall and an exterior wall of the cylinder head cover, and supported by the defining wall and the exterior wall, the defining wall separating the oil separating chamber from the cam housing, and the exterior wall being spaced apart from the portion of the defining wall,
   - the PCV valve is surrounded by a space communicating with the cam housing, the space isolated from the oil separating chamber and the blow-by gas passage.

2. The structure of claim 1, wherein
   the PCV valve is inserted into a first insert hole provided to the defining wall and a second insert hole provided to the exterior wall of the cylinder head cover, and
   the structure further comprises:
   - a first sealing member provided between an outer circumferential face of the PCV valve and an inner circumferential face of the first insert hole; and
   - a second sealing member provided between the outer circumferential face of the PCV valve and an inner circumferential face of the second insert hole.

3. The structure of claim 1, further comprising:
   a protector provided above the space to reduce a risk that fuel piping collides with a cowl member of a vehicle having the engine when the vehicle is in a collision causing the engine to recede, the fuel piping being provided above the cylinder head cover and closer to a front of the vehicle than the space is; and
   a ceiling wall, for the space, functioning as a reinforcement of the protector.

4. The structure of claim 1, wherein
   the engine includes a supercharger, and
   the structure further comprises a passage provided to the interior of the cylinder head cover and arranged in parallel with the space, and, when the supercharger supercharges the engine, the passage allows the blow-by gas, from which the oil mist is separated and removed in the oil separating chamber, to flow back from the oil separating chamber to the intake system of the engine without passing through the PCV valve.

5. The structure of claim 1, wherein
   the space is formed in a position above the cam housing.

6. The structure of claim 1, further comprising:
   an oil reservoir for catching oil that splashed into the space, the oil reservoir provided above a cylinder surrounding the PCV valve and recessed downward;
   a recess adjacent to the oil reservoir; and
   a through hole provided at a bottom of the recess and draining the oil.

7. A cylinder head cover structure for an engine, the structure comprising:
   - a cylinder head cover covering a top of a cylinder head of the engine, and defining a cam housing between the cylinder head and the cylinder head cover;
   - an oil separator provided to an interior of the cylinder head cover, and including an oil separating chamber separately defined from the cam housing, the oil separating chamber separating and removing oil mist contained in blow-by gas; and
   - a positive crankcase ventilation (PCV) valve releasing the blow-by gas, from which the oil mist is separated and removed in the oil separating chamber, from the oil separating chamber to an intake system of the engine via a blow-by gas passage, wherein
   - the PCV valve is located between a portion of a defining wall and an exterior wall of the cylinder head cover, and supported by the defining wall and the exterior wall, the defining wall separating the oil separating chamber and the cam housing, and the exterior wall being spaced apart from the portion of the defining wall,
   - the PCV valve is surrounded by a space communicating with the cam housing, the space isolated from the oil separating chamber and the blow-by gas passage, and
   - the PCV valve, at one axial end, is connected to the oil separating chamber to take in blow-by gas from the oil separating chamber and release the blow-by gas through an end of the PCV valve on the opposite side from the oil separating chamber.

8. The structure of claim 7, wherein
   the space is formed in a position above the cam housing.

9. The structure of claim 7, further comprising:
   an oil reservoir for catching oil that splashed into the space, the oil reservoir provided above a cylinder surrounding the PCV valve and recessed downward;
   a recess adjacent to the oil reservoir; and
   a through hole provided at a bottom of the recess and draining the oil.

* * * * *